United States Patent Office 3,079,106
Patented Feb. 26, 1963

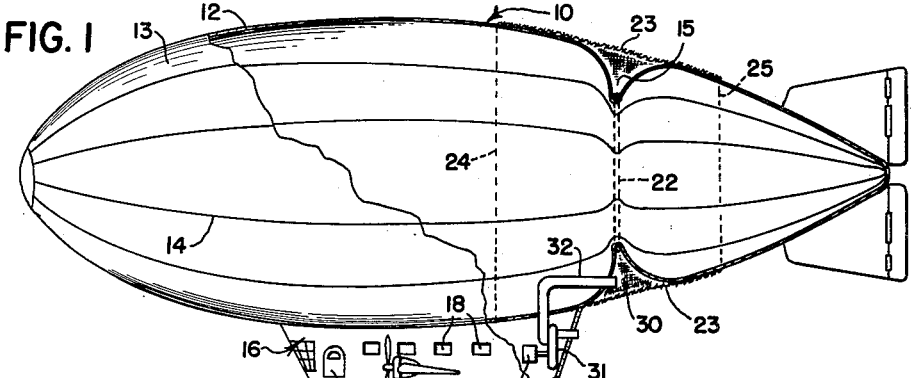

3,079,106
BOUNDARY LAYER CONTROL FOR GAS FILLED BALLOONS AND AIRSHIPS
Gordon R. Whitnah, Minneapolis, Minn., assignor to General Mills, Inc., a corporation of Delaware
Filed Apr. 17, 1961, Ser. No. 103,307
8 Claims. (Cl. 244—30)

This invention is a means for controlling boundary layer air over the surface of gas filled aircraft such as balloons, airships and the like.

Boundary layer control has been recognized previously as a method for reducing drag of air passing over the surface of airfoils. To the best of my knowledge, the application of this principle has been heretofore limited to use in fixed winged aircraft, turbine blades, and the like. In some of the said previous applications of this principle, there are provided a number of exhaust and suction slots in the surface of the wing communicating with suitable metal pipes recessed within the wing. These pipes tend to increase the weight of the aircraft and have thus been found by me to be unsuitable for use in lighter than air craft in view of the necessity to keep the weight of the craft to a minimum. Also in some of said previous applications special nozzles are incorporated into the slots to control the direction of the air so the desired result may be obtained. It has been my experience that said slots are necessarily limited to relatively small areas, whereas in the case of gas filled airships and the like, it becomes necessary to extend the boundary layer control over very large areas in order to produce a noticeable effect. When boundary layer control is used in aircraft wings, the chamber within the wing itself may be incorporated into the boundary layer control system. I have found this too to be a disadvantage in lighter than aircraft since the inside portion of the envelope must contain a lifting gas.

In the case of tethered balloons (which have become important for use in elevating scientific sending instruments, e.g., observation and surveillance equipment such as communication and radar antennas) a major problem has been to keep cable tension to a minimum. The balloon must lift the cable when there is no wind and the cable must be strong enough to restrain the balloon at the maximum wind velocity. Thus, if the air drag on the balloon is fairly high, the strength of the cable must be correspondingly greater. The cable will therefore be heavier and consequently the peak altitude of the balloon will be limited. It is also generally important to keep the balloon as close to directly overhead as possible. Again, if the drag is too high, this problem becomes more difficult.

It is thus an important object of this invention to provide a means for controlling the boundary layer over the surface of gas filled aircraft such as balloons, airships and the like, whereby drag may be decreased.

It is another object of this invention to provide a boundary layer control for lighter than air craft which may extend over a relatively large area of the total area of the surface of the airship.

It is still another object of this invention to provide a boundary layer control for pressurized airships and balloons which adds a minimum of excess weight to the craft.

It is a still further object of this invention to provide boundary layer control for pressurized airships which distributes substantially equal boundary layer control over the entire boundary layer control surface.

It is a still further object of this invention to provide a boundary layer control for gas filled aircrafts such as balloons, airships and the like wherein the boundary layer control may be varied from one part of the airship to another in order to produce the best results in decreasing drag.

The above and other objects and advantages of this invention will be apparent from the accompanying description and drawings in which certain preferred embodiments of the invention are disclosed.

In the drawings:

FIGURE 1 is a side elevation of a gas filled free flying airship incorporating the boundary layer control according to this invention.

FIG. 2 is a side elevation of a tethered gas filled airship partly in section incorporating the boundary layer control according to another embodiment of this invention.

FIG. 3 is a transverse sectional view taken along line 3—3 of FIG. 2.

FIG. 4 is a longitudinal cross-sectional view of a pressurized airship showing another embodiment of the present invention.

Briefly stated, the present invention includes an airship having at least one depression or constricted area in the envelope thereof, a porous sheet material overlying said constriction and means to provide an air pressure differential across the surface of said porous member.

Referring now to FIGURE 1 there is shown a lighter-than-air, gas pressurized aircraft or airship 10 including an envelope or balloon 12 which is made from a number of gores 13 of any desired flexible gas impermeable sheet material known to the art. The gores 13 are sealed together along their edges 14. The gores are cut with curved indentations in each side which correspond to the position of constriction 15 as described more fully hereinbelow.

The airship 10 has the usual fusiform configuration in order to reduce resistance to the passage of air over the surface thereof. Suspended from the bottom of the airship 10 is a gondola 16 including the usual entryway 17 and observation ports 18 when the aircraft is manned. Placed laterally from the gondola 16 is an engine 19 with a propeller for propelling the airship. The constriction 15 is located rearward of the maximum diameter of the envelope 12. The constriction 15 extends around the entire circumference of the airship. The depth and position of the constriction 15 is maintained by means of a circular length of cable 22 which holds the envelope 12 in its constricted position. In FIGURE 1 maximum depth of constriction coincides with the cable 22. Gas pressure within the envelope 12 causes the envelope to the front and back of the constriction cable or band 22 to curve outwardly so that the envelope conforms to a fusiform shape at a distance somewhat in front of the circular line of maximum constriction and somewhat to the rear of said line of maximum constriction.

Positioned over the constriction 15 is a circular band or ring of porous material such as a cloth fabric designated 23. The front of the porous member 23 is attached securely to the envelope 12 of the airship along a circumferential line designated 24 while the rear of the porous member 23 is attached to the envelope along a circumferential line designated 25. Between the porous member 23 and the constricted portion 15 of the envelope 12 is thus defined a circumferential boundary layer control channel 30. The gas pressure within the envelope 12 keeps the portion of the envelope wall between the maximum depth of constriction 15 and line 24 in tension, keeps the portion of the envelope wall between the maximum depth of constriction 15 and line 25 in tension, and keeps the porous material 23 between said lines 24 and 25 in tension.

Within the channel 30, there is established, by exhausting air from said channel, a low pressure condition which creates a pressure gradient across the surface of the porous member 23. To exhaust air from the pressure control channel 30 there is provided within the gondola a pump or fan 31 which communicates with the pressure control channel 30 by means of a duct 32. A motor designated 35 is provided to drive the fan 31.

The porous member 23 must have enough open area to allow air to pass therethrough into channel 30 but should not be open to such a great extent that a pressure differential cannot be established across the entire surface thereof. Thus, if the member 23 is too porous, almost all of the air drawn through duct 32 may enter the pressure control channel 30 through only the bottom part of porous member 23, and little, if any, air will pass through member 23 near the top of the airship. For these reasons the porosity of member 23 is selected in order to distribute the boundary layer control flow through the porous member 23 over its surface evenly. When a negative pressure is established in the pressure control channel 30, the porous member 23 tends to be drawn inwardly somewhat towards the center of the airship, thus destroying to some extent the aerodynamic fusiform shape of the airship. In order to prevent an excessive amount of this distortion, the porous member 23 should be drawn tightly between the circumferential line of attachment 24 at the front thereof and the circumferential line of attachment 25 at the rear.

While the porous member 23 has been shown as a separate piece from the envelope 12, it will be readily apparent from the foregoing description that the porous member could be continuous and integral with the envelope 12, but perforated over its entire area and suitable pieces of imperforate curved sheet material could be secured inside the envelope to form the constriction 15.

Referring now to FIG. 2, there is shown an airship 40 including an envelope 41 which consists of a number of gores of impermeable, flexible sheet material 42 joined together along their edges to form seams 43. Suspended from the bottom of the ship is a gondola 39. Fastened to the bottom of the gondola is a cable 36 extending to the ground to hold the airship 40 in position. Conductors are provided within or attached to the cable 36 to carry current to a fan drive motor 37 or to sensing or communications equipment such as radar equipment 38.

The envelope 41 is divided into a number of axially arranged segments 42, 43, 44 and 45 by means of three circumferential constrictions 46, 47 and 48. The constrictions are strengthened by means of three circumferentially extending cables whose ends are joined together to form loops designated 50, 51 and 52. Gas pressure within the envelope 41 causes the portions of the walls of the envelope on either side of each cable to curve outwardly and maintains said portions of the constriction in position by keeping them under tension.

Placed over each of the constrictions 46, 47 and 48 is a ring of a porous cloth 49 firmly secured along circumferential lines to the envelope 41 on either side of each constriction. This porous cloth 49 can be of individual rings, each of which covers one of the constrictions 46, 47, and 48 and which are firmly secured along circumferential lines to the envelope 41 on either side of its associated constriction. Between the constrictions and the ring of porous material 49, there are defined three pressure control chambers 55, 56 and 57 respectively. The porous cloth 49 is attached to the envelope 41 at its forward end along a circumferentially extending line designated 60 and at the other end along a circumferential line or ring designated 61. The three channels 55, 56, and 57 thus act together with porous member 49 to form a boundary layer control surface extending entirely around the airship and extending in the front from line 60 to line 61 near the rear. As can be seen, approximately half of the total surface of the airship is subjected to boundary layer control. As mentioned in connection with the embodiment illustrated FIGURE 1, the porous member 49 must be porous enough so that air may readily pass through it, but yet not so porous as to prevent a pressure gradient from being established thereacross.

To establish the boundary layer control flow across the porous member 49, there is provided inside the gondola 39 a fan 65. Leading from the fan 65 to the several air pressure control channels, there is provided a manifold 70. The manifold communicates with the channel 55 through a port 71, with the channel 56 through a port 72 and with the channel 57 through a port 73. The air exhausted from the channels 55, 56 and 57 by the pump 65 is expelled into the atmosphere through an opening 80. The portion of porous member 49 overlying each of the channels 55, 56 and 57 may differ in area. In order to provide the most efficient reduction in drag, there are provided within the manifold 70, three flow control valves 82, 83 and 84. Valve 82 controls the amount of air flowing from channel 55, valve 83 controls the amount of air flowing from channel 56 and valve 84 controls the amount of air flowing from channel 57. By this means, the pressure differential may be varied from the front of the boundary layer control surface to the back in order to compensate for differences in the area of each of the porous members, differences in air turbulence and other factors whereby greater efficiency in drag reduction may be obtained.

Referring now to FIGURE 4, there is shown a gas filled balloon 90 comprising an impervious, flexible envelope 91 having a small canopy 92 suspended from the bottom thereof. The balloon 90 is anchored to the ground by cable 96 attached to the bottom of canopy 92. Within the envelope there are provided two gas filled rings 93 and 94, formed from impermeable flexible sheet material. Rings 93 and 94 are concentric with the axis of the airship 90 and arranged in side by side abutting relationship with their outside edges in contact with the envelope 91. Each of rings 93 and 94 is filled with a suitable gas so that the rings become relatively stiff and thus give support to the envelope 91. The rings are secured to each other to form a gas tight seal along line 95 and are also secured to the envelope along circumferential gas tight seal lines 97 and 98 extending around the periphery thereof. Fastened between circumferential seal lines 97 and 98, there is a ring of porous sheet material 99 which is also secured firmly to the envelope along lines 97 and 98. Thus, between the porous sheet 99 and portions 93a and 94a of the walls of the rings 93 and 94 is defined a circumferential boundary layer control channel 100. The portions 93a and 94a and the porous sheet are kept under tension by the gas in rings 93 and 94. To exhaust air from the circumferential channel 100, there is provided an exhaust duct 101 which extends downwardly from channel 100 below the envelope 90 and is connected at the other end to a fan 102 within canopy 92 which is driven by a suitable motor 103. The fan draws air through the duct 101 from the channel 100 creating a low pressure condition within channel 100 causing air to pass through porous member 99. As in the above embodiments, the porosity of the porous member 99 is adjusted so that the pressure differential thereacross is substantially equal over its entire surface, thereby establishing boundary layer control over the entire area of the porous member 99. It will be noted that the dimensions of channel 100 are maintained solely by the pressurized rings 93 and 94 so that no constricting cable is required as in the embodiments illustrated in FIGS. 1, 2, and 3.

If the pressure is not sufficiently high within rings 93 and 94, the portion 93a and 94a of the rings joined together along line 95 may be forced outwardly into channel 100 which, of course, is undesirable. It is thus necessary to keep the pressure within the rings at least as great as the pressure within the main part of the envelope and preferably greater than that in the main part of the envelope.

The embodiment illustrated in FIG. 1 is particularly valuable when it is desired to provide boundary layer control over a relatively small segment of the total area of the airship. In this embodiment a minimum of extra weight is added by the boundary layer control mechanism and fan. The embodiment illustrated in FIG. 2 adds more weight to the airship since three cables are required, a greater amount of the permeable material is used, a greater amount of duct work and a larger fan are used. On the other hand, a greater amount of the total area of the airship may be subjected to boundary layer control. Furthermore, boundary layer control may be carried out more efficiently since the pressure differential across the several sections of the porous material may be adjusted from the front section of the aircraft to the rear by means of valves in order to permit boundary layer variations from the front of the boundary layer control surface to the rear.

The embodiment illustrated in FIG. 4 has the advantage that there will ordinarily be less weight added to the airship than the prior embodiments since the relatively heavy constricting cable is not required. The form of apparatus shown in FIG. 4 will also be easier to construct in most instances since the gores used in the envelope of the airship do not have to be specially shaped to provide the constriction 100. A still further advantage is that the annular rings 93 and 94 will assist in strengthening the airship because of the outward pressure exerted by them.

While the porous members have been illustrated as porous cloth material, any type of porous material will be satisfactory as long as it is light in weight and has the requisite strength. As hereinbefore stated, it is important that the porosity of the porous member be maintained within limits which will readily allow air to flow therethrough but yet which is not porous enough so that the pressure differential cannot be maintained across the surface thereof. Thus if the porous member has too great a percentage of open area, the air being drawn through the duct may pass through only a small section of the total area thereof.

It will be apparent that while a strong cable has been called for in the embodiments illustrated in FIGS. 1 and 2 to constrict the walls of the airship, if the flexible sheet material from which the walls themselves are made has sufficient strength, the cables may be eliminated.

In the embodiments described, the boundary layer control channel or depression extends around the entire circumference of the envelope but, if desired, the depression need not extend entirely around the ship. It may be a conical depression, if desired, or it may be an elongated depression running along the longitudinal axis of the airship. In the latter two instances cables extend from the bottom of the depression to the opposite side of the envelope. Circumferential channels are preferred because of their symmetry and because the boundary layer control can then be strategically located at the most desirable point.

In view of the principles set forth herein, I have shown some of the ways of carrying out the present invention and some of the equivalents suggested by these disclosures.

What is claimed is:

1. A boundary layer control for gas filled airships and ballons comprising an elongate flexible gas impervious fusiform envelope having a constriction therein located rearward of the maximum diameter thereof, a porous material secured to the edges of said constriction and thereby forming a channel between the portion of said envelope which is constricted and said porous member, and means for exhausting air from said channel.

2. A boundary layer control for gas filled airships and balloons comprising an elongate flexible gas impervious fusiform envelope having a constriction therein, said constriction being substantially perpendicular to the elongated axis of said envelope and extending around the circumference of said envelope, a porous member overlying the edges of said constriction and thereby forming a channel between the portion of said envelope which is constricted and said porous member, and means for exhausting air from said channel.

3. A boundary layer control for gas filled airships and balloons comprising a gas impervious fusiform envelope made of flexible sheet material adapted to contain lifting gas, at least one portion of said envelope being displaced inwardly from the outer surface of said airship, light weight porous sheet material extending over said inwardly displaced portion and sealed securely to said envelope along the edges of said displaced portion, the sides of said inwardly displaced portion and said porous sheet material defining a space therebetween, and means for exhausting air from said space.

4. A boundary layer control for airships and balloons comprising a gas impervious flexible envelope adapted to contain a lifting gas and provided with a plurality of circumferential depressions therein, porous flexible sheet material overlying the edges of said depressions and defining chambers between said porous sheet material and said depressions, means to exhaust air from said chambers and means to regulate the flow of air from at least one of said chambers.

5. A boundary layer control for gas filled airships and balloons comprising an elongate gas impervious flexible fusiform envelope having a constriction therein provided with wall portions, an air porous material secured to said envelope and overlying the edges of said constriction and thereby forming a channel between said wall portions and said porous material, said wall portions and said porous material being held in tension by the gas pressure within the envelope, and means for exhausting air from said channel.

6. In an elongate gas filled airship or balloon, a flexible envelope adapted to contain a lifting gas, at least two hollow rings formed from flexible sheet material within said airship and concentric therewith, a gas-tight seal between said rings to secure said rings together in tangential abutting relationship, a portion of the circumference of said envelope being sealed to the outside circumference of most anterior of said rings and extending forwardly therefrom, a portion of the circumference of said envelope being sealed to the outside circumference of the most rearward of said rings and extending backwardly therefrom, a ring of porous sheet material concentric with said airship etxending between the outside circumference of said hollow rings, said porous sheet material and said rings defining a channel therebetween and a blower for exhausting air from said channel.

7. In an elongate gas filled airship or balloon, an envelope adapted to contain a lifting gas, at least one cable extending around the circumference of said envelope substantially perpendicular to the elongated axis of said envelope, the ends of said one cable being attached together to form a loop, said loop being smaller in diameter than the outside diameter of said airship at the point where said loop is located whereby said envelope is divided into a plurality of longitudinally disposed segments separated by a circumferentially extending constriction formed by said loop, a ring of porous sheet material overlying said constriction, said ring of porous sheet material being secured to said envelope on either side of said constriction to define a boundary layer control channel between said ring of porous sheet material and said constriction and a pump for exhausting air from said channel.

8. A boundary layer control according to claim 7 where a plurality of channels are provided and wherein means is provided for regulating the flow of air from each such channel to increase the efficiency of the boundary layer control for reducing drag.

References Cited in the file of this patent
UNITED STATES PATENTS

| | | |
|---|---|---|
| 1,642,270 | Slate | Sept. 13, 1927 |
| 2,478,792 | Trey | Aug. 9, 1949 |
| 2,742,247 | Lachmann | Apr. 17, 1956 |
| 2,778,585 | Tschudy | Jan. 22, 1957 |